United States Patent
Su

[11] Patent Number: 6,032,533
[45] Date of Patent: Mar. 7, 2000

[54] ABSOLUTE AMPLITUDE SENSOR DEVICE

[76] Inventor: Li Su, 303, No. 27, Fuxingmenwai Street, Beijing 100045, China

[21] Appl. No.: 08/776,632
[22] PCT Filed: Jul. 28, 1995
[86] PCT No.: PCT/CN95/00062
§ 371 Date: Apr. 25, 1997
§ 102(e) Date: Apr. 25, 1997
[87] PCT Pub. No.: WO96/04531
PCT Pub. Date: Feb. 15, 1996

[30] Foreign Application Priority Data

Jul. 30, 1994 [CN] China ................................... 94107907

[51] Int. Cl.[7] ..................................................... G01H 1/00
[52] U.S. Cl. .................................. 73/579; 73/662; 73/668
[58] Field of Search ............................. 73/570, 579, 662, 73/663, 668, 654; 324/207.11, 207.12, 207.13, 207.16, 207.22, 226, 262

[56] References Cited

U.S. PATENT DOCUMENTS

| 3,526,128 | 9/1970 | Kornienko et al. | 73/71.2 |
| 3,871,221 | 3/1975 | Himmler et al. | 73/67 |
| 5,111,697 | 5/1992 | Habermann et al. | 73/668 |
| 5,161,414 | 11/1992 | Rubbelke | 73/658 |

Primary Examiner—Hezron Williams
Assistant Examiner—Thuy Vinh Tran

[57] ABSTRACT

An absolute amplitude sensor device for measuring absolute vibrations comprising a non-contact displacement sensor, in particular, an eddy-current sensor and a vibrator. Said vibrator is comprised of a number of inertial mass pieces, springs, a damper and a housing. The inertial mass piece is levitated in said housing by means of said springs and damper. The output signal of said device is directly proportional to the amplitude of the object to be measured. The number of said inertial mass pieces is N. It is a single-vibrator when N equals 1 and a multi-vibrator when N equals 2 to 20.

20 Claims, 11 Drawing Sheets

ABSOLUTE AMPLITUDE SENSOR DEVICE

TECHNICAL FIELD

The present invention relates to an absolute amplitude sensor device, which is used in the field of the vibration monitoring technique for geological prospecting, earthquake, architecture, highway, bridge, transportation and huge equipment, and can be used to monitor the vibration amplitude in any direction.

BACKGROUND ART

In earthquake monitoring and the vibration monitoring of moving automobiles, ships and aircrafts, theoretically it is impossible to obtain a reference point of the inertial frame; and in the vibration test of foundation and architectural pile foundation, and the vibration monitoring of huge equipment with vibration source, such as turbines, steamturbines, generators, etc., it is difficult to find a reference point of the inertial frame on the surface of the area nearby, because the vibration of the equipment itself leads to the vibration of the foundation, so the vibration signal measured is obviously not accurate or mixed with the vibration interference in the reference point. For instance, conventional eddy-currrent amplitude sensor and transformer type sensor are all relative measuring sensors. Adopting the former sensor, Bently Company of U.S.A. installed another set of velocity meters at the reference point to measure the vibration of the reference point itself, and then counteracted the interference by the inverse-phase superimposition of the two sets of signals; but the realization of this method is complicated and quite difficult (Introduction of products of Bently Company in 1989). In case of the latter sensor, it is necessary to fix the primary or secondary winding on an motionless body near the vibrating body measured, but the distance between the probe and the surface of the vibrating body measured is so short that no motionless body can exist within such a short distance, therefore in the practice of its application, a probe is installed on a body with relatively weak vibration as the reference point, and the result measured thereby is obviously not accurate enough.

In addition, although the Chinese Patent No. 87105424, namely, "Suspended Type Eddy-Current Earthquake Wave Detector" has the advantages that the natural frequency of the vibrating system is adjustable and that the transverse effect is weakened, with this apparatus, the magnitude of the eddy-current magnetic field is a function of the relative movement velocity between the main magnet and the eddy-current sleeve, and the inductive electromotive force in the coil is a function of the velocity of the coil in the eddy-current magnetic field, in this way a "two-stage effect" is produced, that is to say that the electric signal produced in the fixed wave detector coil is proportional to the acceleration of the movement of the outer casing. Furthermore, the Chinese Patent No. 92102774.5, namely, "Apparatus for Measuring the Earthquake Type Low Frequency Vibration", adopts a kind of commonly used earthquake type vibration velocity sensor, however, in order to extract the amplitude, it is necessary to resort to the revision of multiple integral or integral circuit or of the computer, and it is difficult to extract the accurate amplitude data.

OBJECT OF THE INVENTION

The object of the present invention is to provide an absolute inertial eddy-current amplitude sensor with accurate measurement, without a motionless foundation support serving as inertial reference frame. Said sensor can be installed directly on the vibrating body measured to realize the measurement, thereby overcoming the defects in the prior art mentioned above.

Another object of the present invention is to provide an amplitude sensor suitable for measuring vibration signals with broad frequency range response, such as those with frequency of 0–3000 Hz.

Still another object of the present invention is to provide a sensor which can measure amplitudes in any direction.

SUMMARY OF THE INVENTION

In the technique scheme (as shown in FIG. 1) of the present invention, non-contact displacement sensor 4 is connected with a vibrator which comprises inertial mass piece 5, spring K, damper r and housing 1. Inertial mass piece 5 is suspended, with the aid of spring K and damper r, in housing 1 of the sensor device, and it is so designed that the output signal thereof is proportional to the amplitude of the vibrating body measured 3. The number of inertial mass pieces 5 is N. The sensor device is of single vibrator when N=1, and is of multiple-vibrators when N=2–20.

The non-contact displacement sensors includes two types: eddy-current type displacement sensor and capacitor type displacement sensor. In case of the eddy-current type, it comprises a coil 8 located at the front end of the sensor's detecting section, and eddy-current target 6. The coil and target are connected with inertial mass piece m, preamplifier 7, spring K, damper r and housing 1 to form the sensor device. The above mentioned preamplifier 7 can be a resonance circuit, bridge circuit or coil-Q test circuit, which transforms the measured parameters of the amplitude and displacement into voltage or electric current output. The resonance circuit may be a frequency modulation, amplitude modulation or frequency-amplitude modulation circuit. In case of the capacitor type, it comprises parallel plate capacitor and vibrator, one of the plates as well as the inertial mass piece are suspended in the housing by means of a spring and a damper, and the other plate is fixed to the housing.

According to the present invention, an adjustable additional weight piece is mounted on each inertial mass piece of the sensor device, so as to change the natural frequency of the sensor, for adapting to different requirements of vibration measurements. A locking set-up is installed on each inertial mass piece to lock the inertial mass piece when the sensor device is not in operation, for facilitating the movement and transportation of the sensor, and preventing the sensitive elements thereof from damage caused by violent vibration. A static calibration spigot is installed on the sensor device, and a micrometer can be inserted and fixed therein to perform the static calibration of the target distance. Inside-outside threaded connection members is fitted on the top and bottom of the housing, so as to fix the sensor device onto the vibrating body measured. The top or bottom of the housing is made to be a plane so that the sensor device can be easily stuck to or buried in the vibrating body measured. In order to reduce the volume and weight of the sensor device to the minimum, a specific integrated circuit (IC) chip is used in the preamplifier and a shield is installed so as to reduce the external jamming and to increase the sensitivity.

In the sensor device of the present invention, three types of springs are used, according to the different manners of suspending the inertial mass piece, they are as follows:

1. Rectangular spring plates, and a cylindrical or cone or date-core shaped prestressed extention spring in the pulled and hung suspended arm type absolute amplitude sensor device;

2. One or more pairs of cylindrical compression springs in the cylindrical spring type absolute amplitude sensor, and
3. One or more pairs of circular spring plates in the circular spring plate type absolute amplitude sensor.

In the sensor device of the present invention, the damper is a damping cup. Or alternatively, the spring and the damper can be combined into a single body to form a cone or date-core shaped spring with damping.

In the eddy-current sensor of the sensor device of the present invention, an iron core can be disposed into the detecting coil so as to increase the sensitivity of the sensor.

As in the technique scheme of the present invention the sensor device is directly stuck to or fixed with machinery on a vibrating body measured, and due to the inertia, the housing of the vibrator vibrates along with the vibrating body, while the inertial mass piece is nearly immobile, so that the relative displacement between the housing and the inertial mass piece can be detected by means of the non-contact displacement sensor. This relative displacement is the amplitude of the vibrating body measured. This measuring method is an absolute amplitude measurement of the vibrating body, it overcomes the defects of the relative measurement in the prior art, i.e. a grave influence on the accuracy of the amplitude measurement of the vibrating body measured, due to the vibration disturbance of the reference point.

In order to measure a broader frequency range vibrating signal, the natural frequency of the sensor device of the present invention can be changed by providing the sensor device with a spring of different shapes and an inertial mass piece of different weights.

The sensor device of the present invention can be used in measuring the amplitude in any direction of a vibrating body, the method thereof is to make the vibration axis line of the inertial mass piece parallel to the direction required in the measurement, and to adjust the additional weight and/or the regulating knob after the sensor device is fixed, so that the inertial mass piece is suspended in the housing and located at an optimum initial position. The amplitude drawn from this measurement is the amplitude in the direction required.

Compared with the prior art the present invention has the following beneficial effects:

1. The difference between the sensor device of the present invention and the electrodynamic type(inductive, magnetic-electric, or dynamic-electric type) sensor is that the output of the latter is proportional to the vibration velocity of the vibrating body measured. It is difficult to obtain an accurate amplitude value when a non-simple-harmonic vibration, especially a transient vibration such as an impact, is measured. Even if a integrating circuit or computer revision is used, the satisfactory amplitude-time curve can not be obtained; while an accurate amplitude behavior of a vibrating body can be gained directly by means of the sensor device of the present invention.

2. The difference between the sensor device of the present invention and the piezoelectric crystal sensor is that the output of the latter is proportional to the force applied or in other words to the acceleration of the vibrating body measured. It is difficult to filter the regenerative oscillation of the piezoelectric crytal sensor itself without losing the low-frequency signal required when a transient vibration such as an impact is measured. So that when the amplitude is to be measured, an accurate amplitude data can not be obtained though multiple integral circuit or computer revision is applied.

3. The transformer or differential transformer type displacement sensor has the same shortcomings as mentioned above, in addition, it is not fit for dynamic measurement of high-frequency signals, and the sensitivity of these sensors is rather affected by the pumping frequency especially in measuring a transient vibration such as an impact. But the sensor device of the present invention solves quite well the difficulties mentioned above.

ADVANTAGEOUS EFFECTS

The absolute amplitude sensor device of the present invention facilitates the absolute measurement of the vibrating amplitude instead of the relative measurement. In its structure the detecting coil and the preamplifier coupled therewith are formed into a single body and a specific IC chip is used in the preamplifier, so that the sensor device is of high antijamming property, less deterioration of signals, high sensitivity, small volume and convenient installation.

BRIEF DESCRIPTION OF THE DRAWINGS

Preferred embodiments of the present invention are described in detail with reference to the figures as follows.

DETAILED DESCRIPTION

The eddy-current amplitude sensor device includes eight fundamental structural configurations described in FIG. 2 to FIG. 9, according to the is different type of suspending the inertial mass piece, three types are derived from each configuration, therefore there are 24 structure types totally. The exemplary embodiments of these types are described in detail below with reference to the figures.

Figure 1:
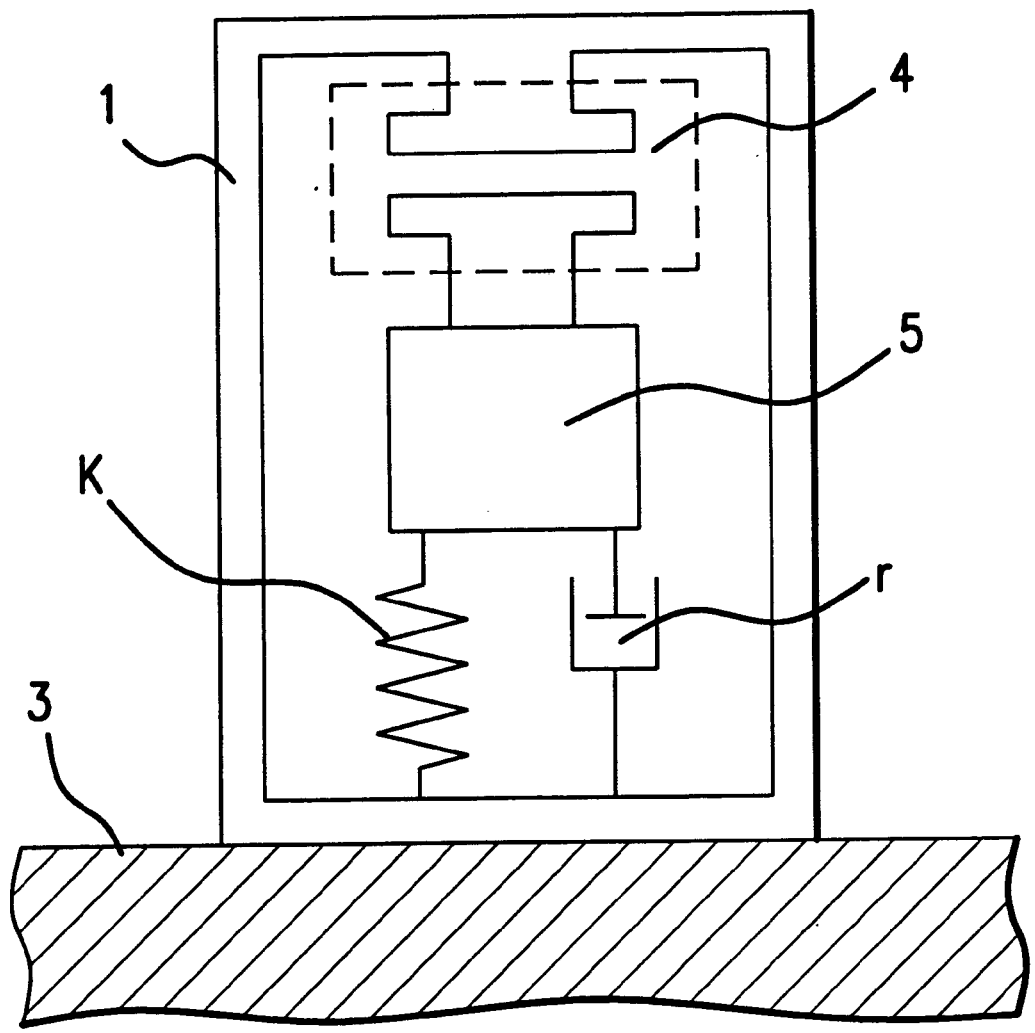
FIG. 1 illustrates the structural configuration of the absolute amplitude sensor.
Figure 2:
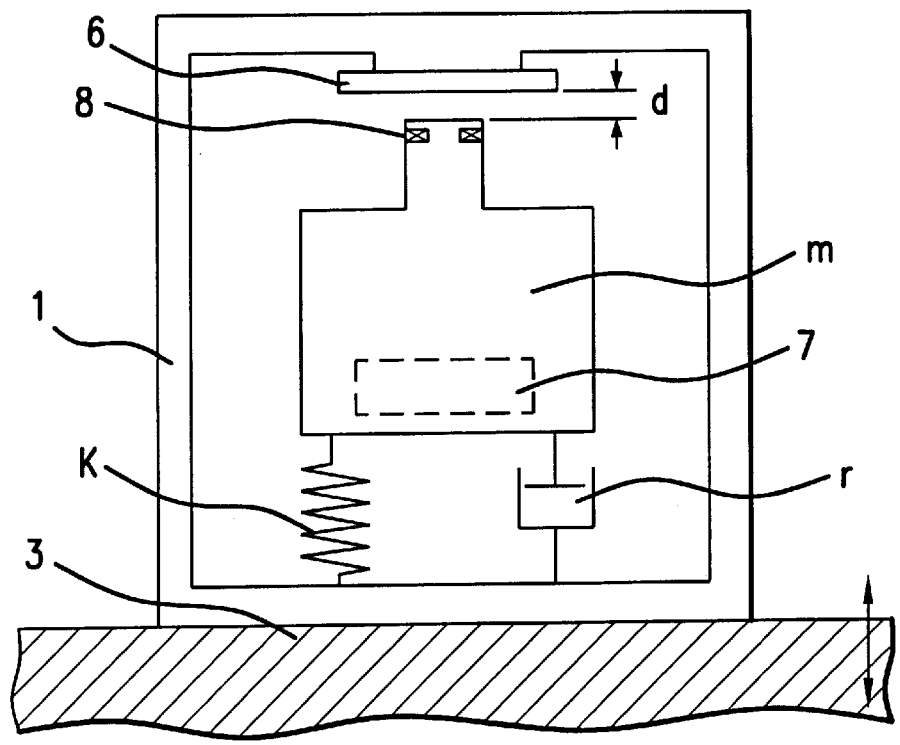
FIG. 2 illustrates the structural configuration of the single vibrator moving coil general type eddy-current amplitude sensor.

FIG. 2 illustrates N=1 single vibrator moving coil general type structure, in which a detecting coil 8 and a preamplifier 7 are formed into a single body, and together with a body of certain weight and an additional weight are formed into an inertial mass piece m, which is suspended in housing 1 with the aid of a spring K and a damper r. Eddy-current target 6 is fixed to housing 1, and the amplitude of vibrating body 3 is proportional to the variation of target distance d (the distance between the detecting coil and the eddy-current target), i.e. proportional to the output voltage of the sensor.

Figure 3:
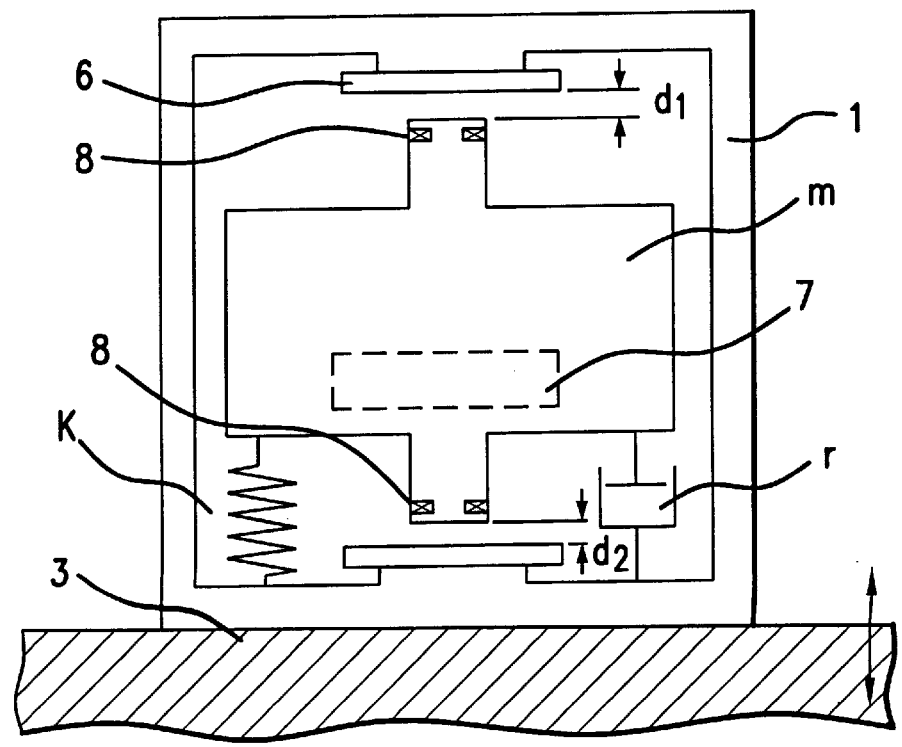
FIG. 3 illustrates the structural configuration of the single vibrator moving coil differential type eddy-current amplitude sensor.

FIG. 3 illustrates N=1 single vibrator moving coil differential type structure, in which two detecting coils 8 and the respective preamplifiers 7 coupled therewith are formed into a single body, and in combination with a body of certain weight and an additional weight are formed into an inertial mass piece m, which is suspended in housing 1 with the aid of spring K and damper r. Two eddy-current targets 6 are fixed to housing 1, the amplitude of vibrating body 3 measured is proportional to the sum of the absolute variation values of two target distances $d_1$, $d_2$.

Figure 4:
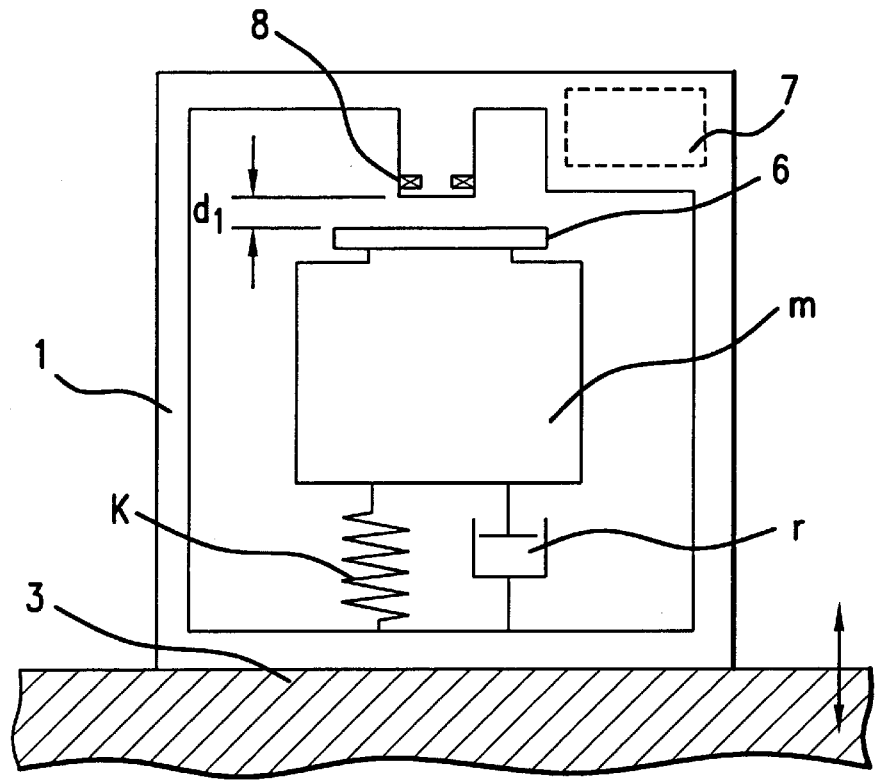
FIG. 4 illustrates the structural configuration of the single vibrator moving target general type eddy-current amplitude sensor.

FIG. 4 illustrates N=1 single vibrator moving target general type structure, in which eddy-current target 6 combined with a body of certain weight and an additional weight is formed into an inertial mass piece m, which is suspended in housing 1 with the aid of spring K and damper R. Detecting coil 8 and preamplifier 7 coupled therewith are formed into a single body, and are fixed to housing 1. The amplitude of vibrating body 3 measured is proportional to the variation value of target distance d.

Figure 5:
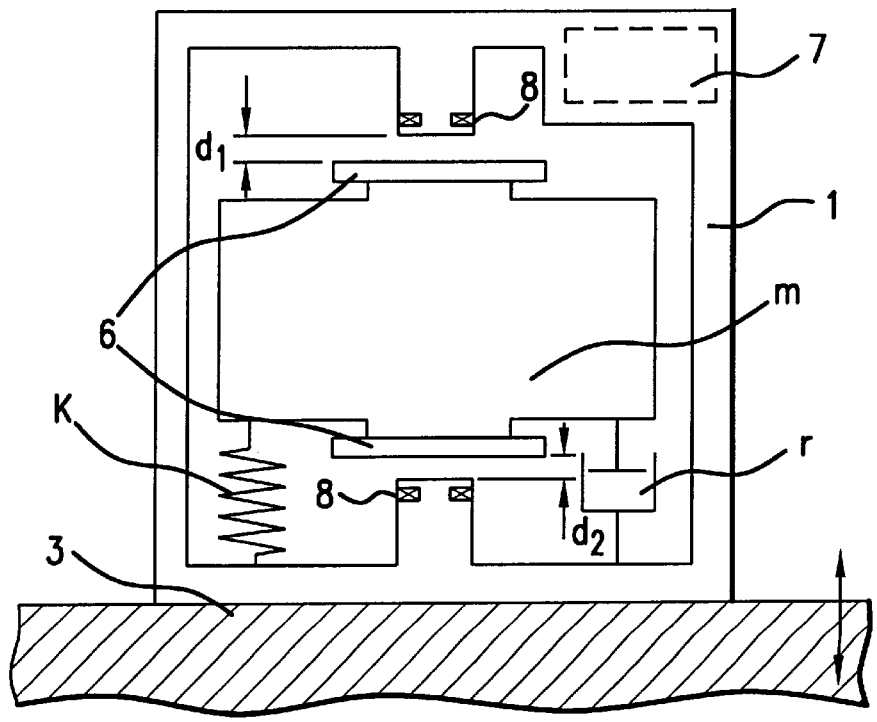
FIG. 5 illustrates the structural configuration of the single vibrator moving target differential type eddy-current amplitude sensor.

FIG. 5 illustrates N=1 single vibrator moving target differential type structure, in which two eddy-current targets 6 combined with a body of certain weight and an additional weight are formed into an inertial mass piece m, which is suspended in housing 1 with the aid of spring K and damper R. Two coils 8 and the respective preamplifiers 7 coupled therewith are formed into a single body and are fixed to housing 1. The amplitude of vibrating body 3 measured is proportional to the sum of the absolute variation values of the two target distances $d_1$, $d_2$.

Figure 6:
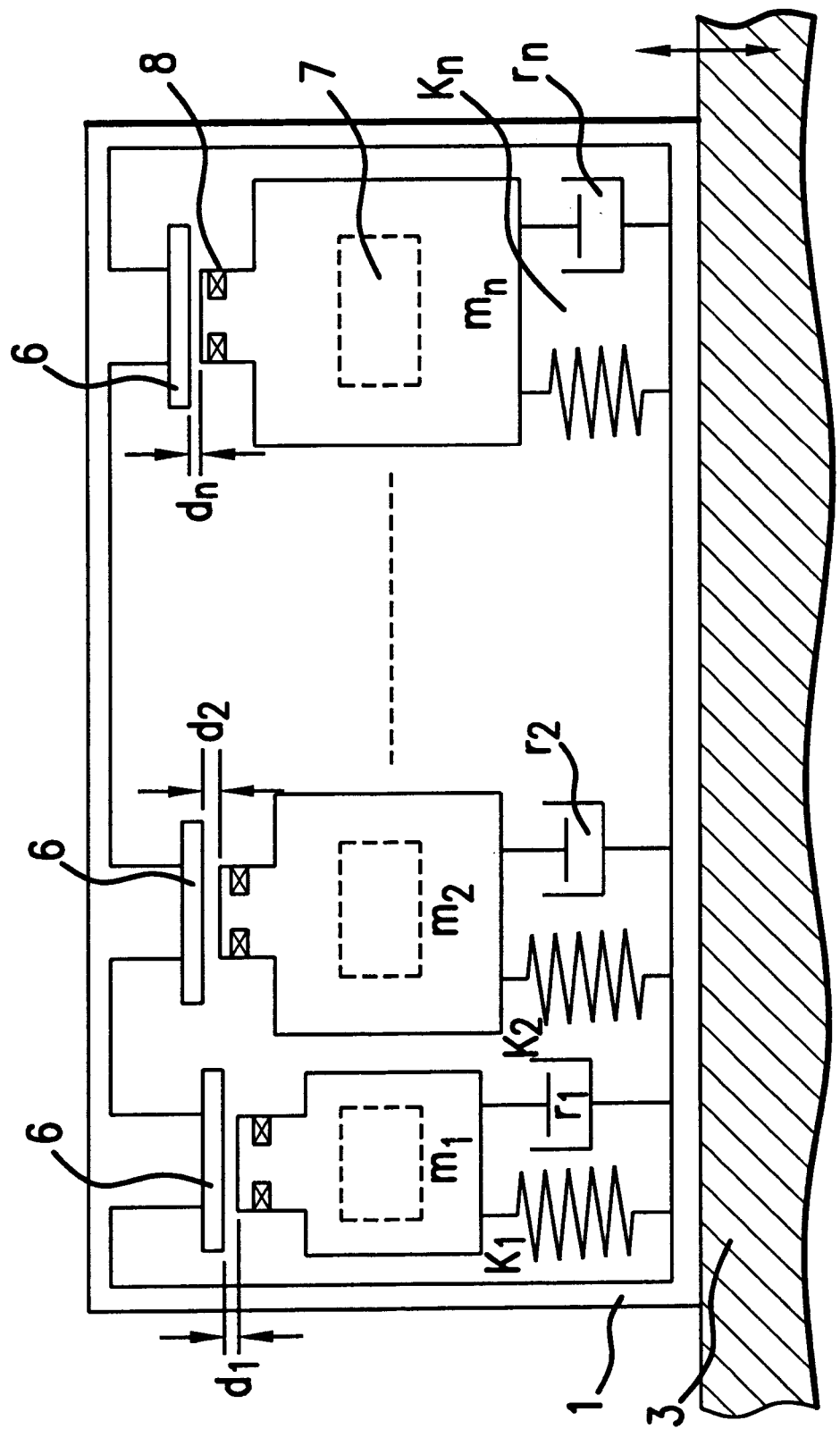
FIG. 6 illustrates the structural configuration of the multiple-vibrator moving coil general type eddy-current amplitude sensor.

FIG. 6 illustrates N=2–20 multiple-vibrator moving coil general type structure, in which N detecting coils 8 and the respective preamplifiers 7 coupled therewith are formed into single bodies, which together with a body of certain weight and an additional weight is formed into an inertial mass piece, totally N inertial mass pieces $m_1, m_2, \ldots, m_n$, all of which are suspended in a housing 1 with the aid of springs $K_1, K_2, \ldots, K_N$ and dampers $r_1, r_2, \ldots, r_n$, and N eddy-current targets are fixed to housing 1. The sensor of this structure is suitable for measuring broader frequency range vibration signals.

Figure 7:
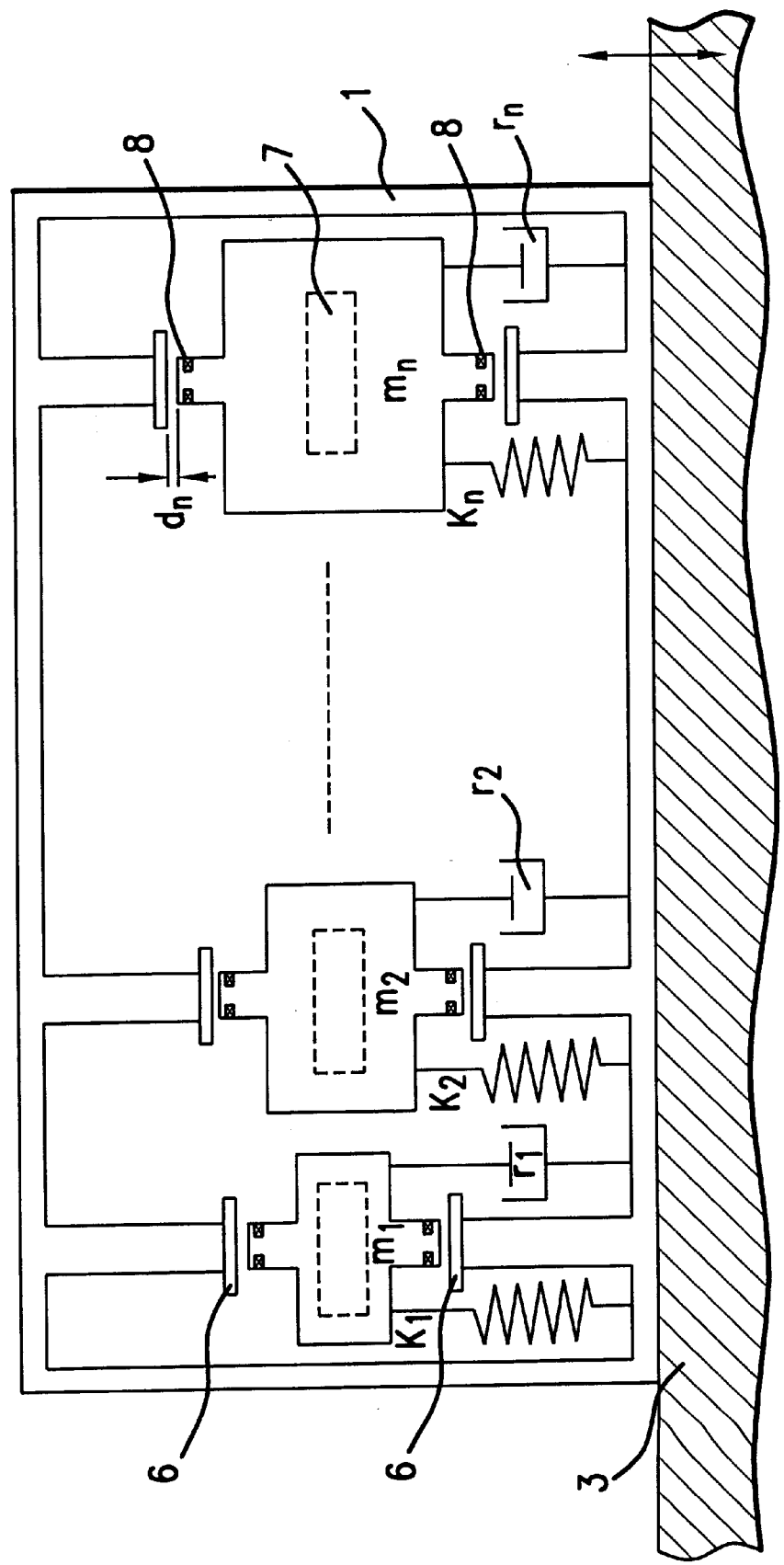
FIG. 7 illustrates the structural configuration of the multiple-vibrator moving coil differential type eddy-current amplitude sensor.

FIG. 7 illustrates N=2–20 multiple-vibrator moving coil differential type structure, in which every two of the 2 N detecting coils 8 and the preamplifiers 7 coupled therewith respectively are formed into a group, each group together with a body of certain weight and an additional weight is formed into an inertial mass piece, totally N mass pieces $m_1, m_2, \ldots, m_n$, which are suspended in housing 1 with the aid of springs $K_1, K_2, \ldots, K_n$ and damper $r_1, r_2, r_n$. Every two of 2 N eddy-current targets corresponding to their respective pair of coils 8 are formed into a group and are fixed to housing 1. The sensor of this structure is suitable for measuring broader frequency range small vibration signals.

Figure 8:
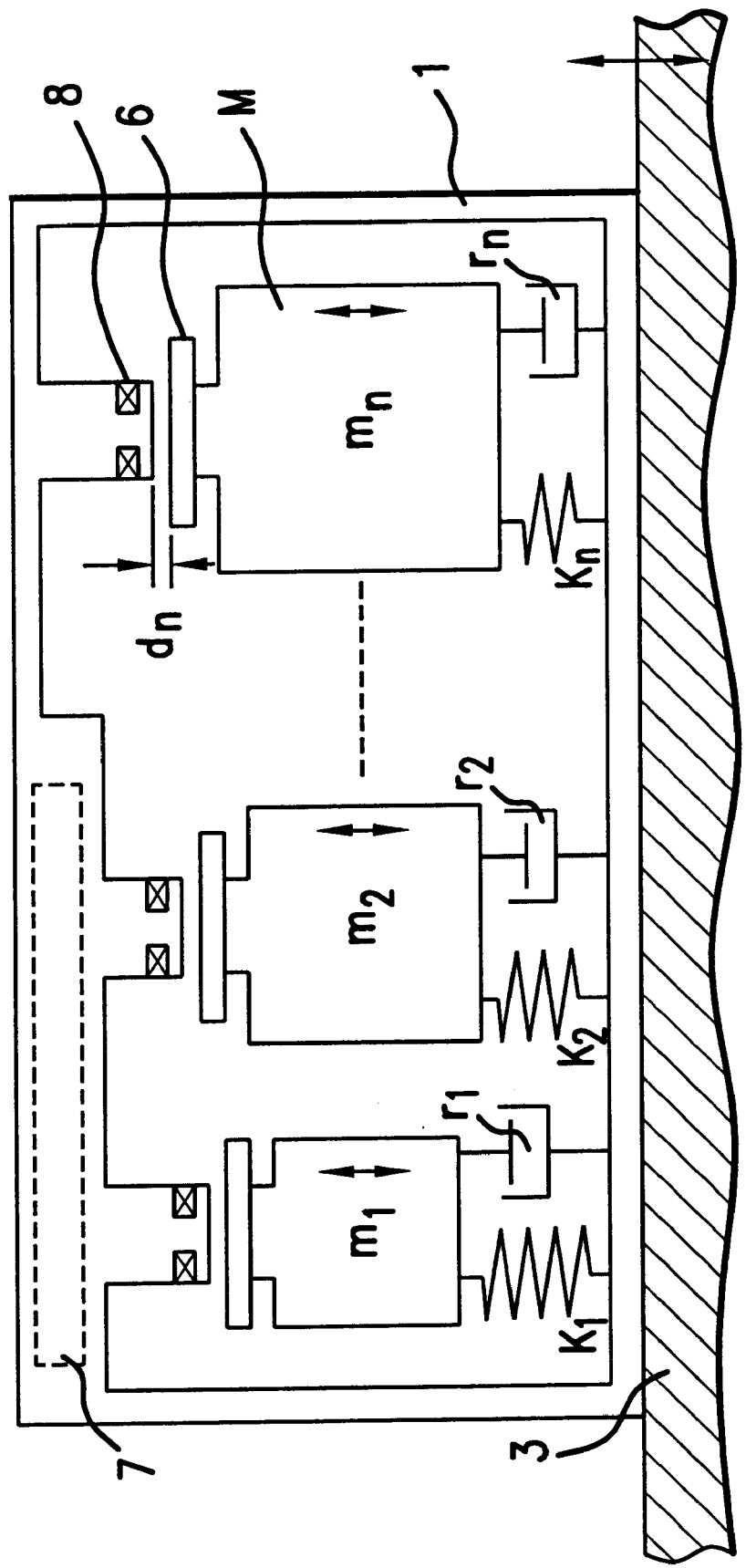
FIG. 8 illustrates the structural configuration of the multiple-vibrator moving target general type eddy-current amplitude sensor.

FIG. 8 illustrates N=2–20 multiple-vibrator moving target general type structure, in which each of the N eddy-current targets together with respective body of certain weight and an additional weight is formed into an inertial mass piece, totally N mass pieces $m_1, m_2, \ldots, m_n$, which are suspended in housing 1 with the aid of springs $K_1, K_2, \ldots, K_n$ and dampers $r_1, r_2, \ldots, r_n$. Each of the detecting coils 8 corresponding to its respective target and the preamplifier 7 coupled therewith, are formed into a single body, and fixed to housing 1.

Figure 9:
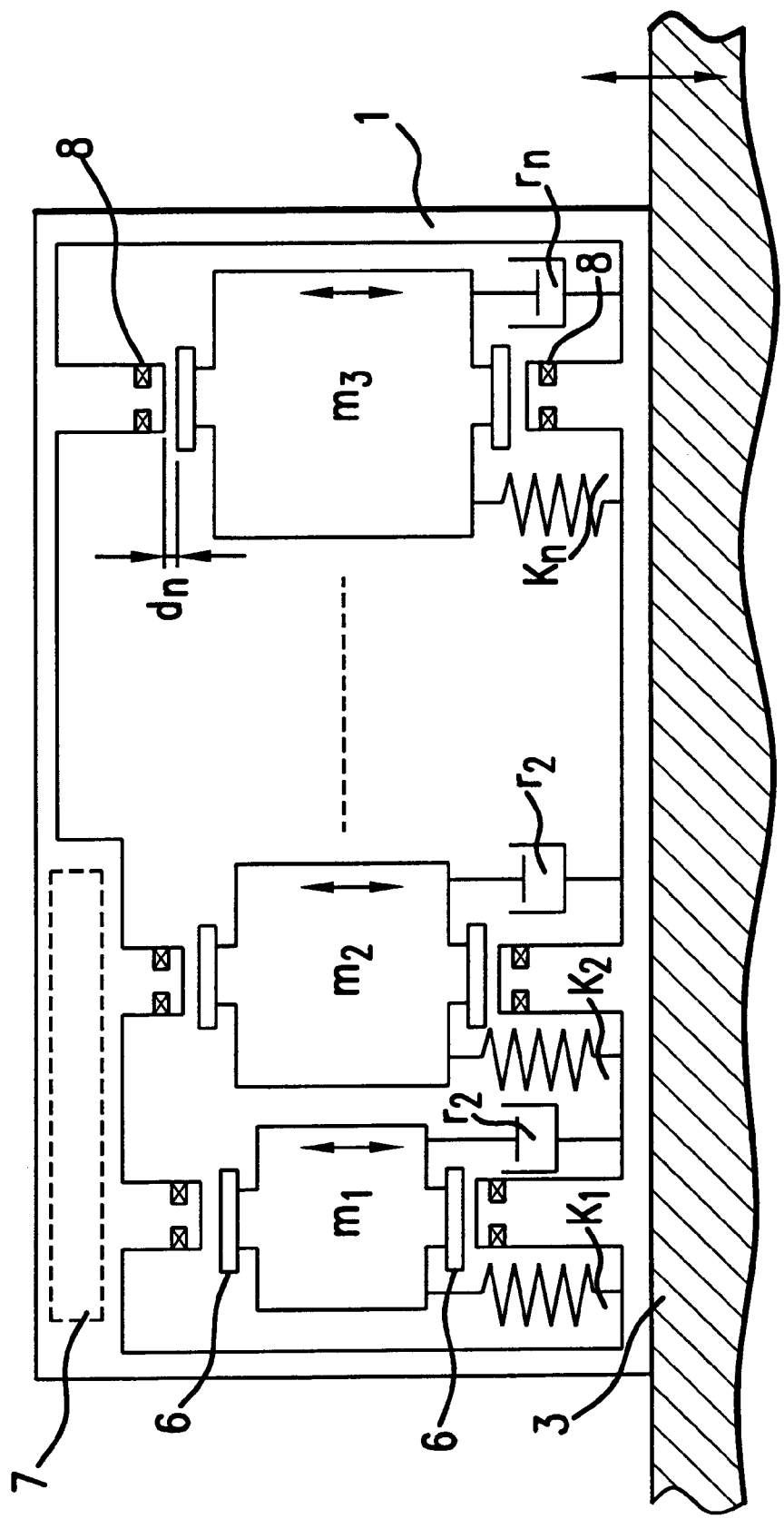
FIG. 9 illustrates the structural configuration of the multiple-vibrator moving target differential type eddy-current amplitude sensor.

FIG. 9 illustrates N=2–20 multiple-vibrator moving target differential type structure, in which every two of the 2 N eddy-current targets are formed into a group, each group together with a body of certain weight and an additional weight is formed into an inertial mass piece, totally N mass pieces $m_1, m_2, \ldots, m_n$, which are suspended in a same housing 1 with the aid of springs $K_1, K_2, \ldots, K_n$ and dampers $r_1, r_2, \ldots, r_n$. Each of the detecting coils 8 corresponding to its respective target, together with the preamplifier 7 coupled therewith, are formed into a single body, in which every two of the coils and their preamplifiers are formed into a group and fixed to housing 1.

Figure 10:
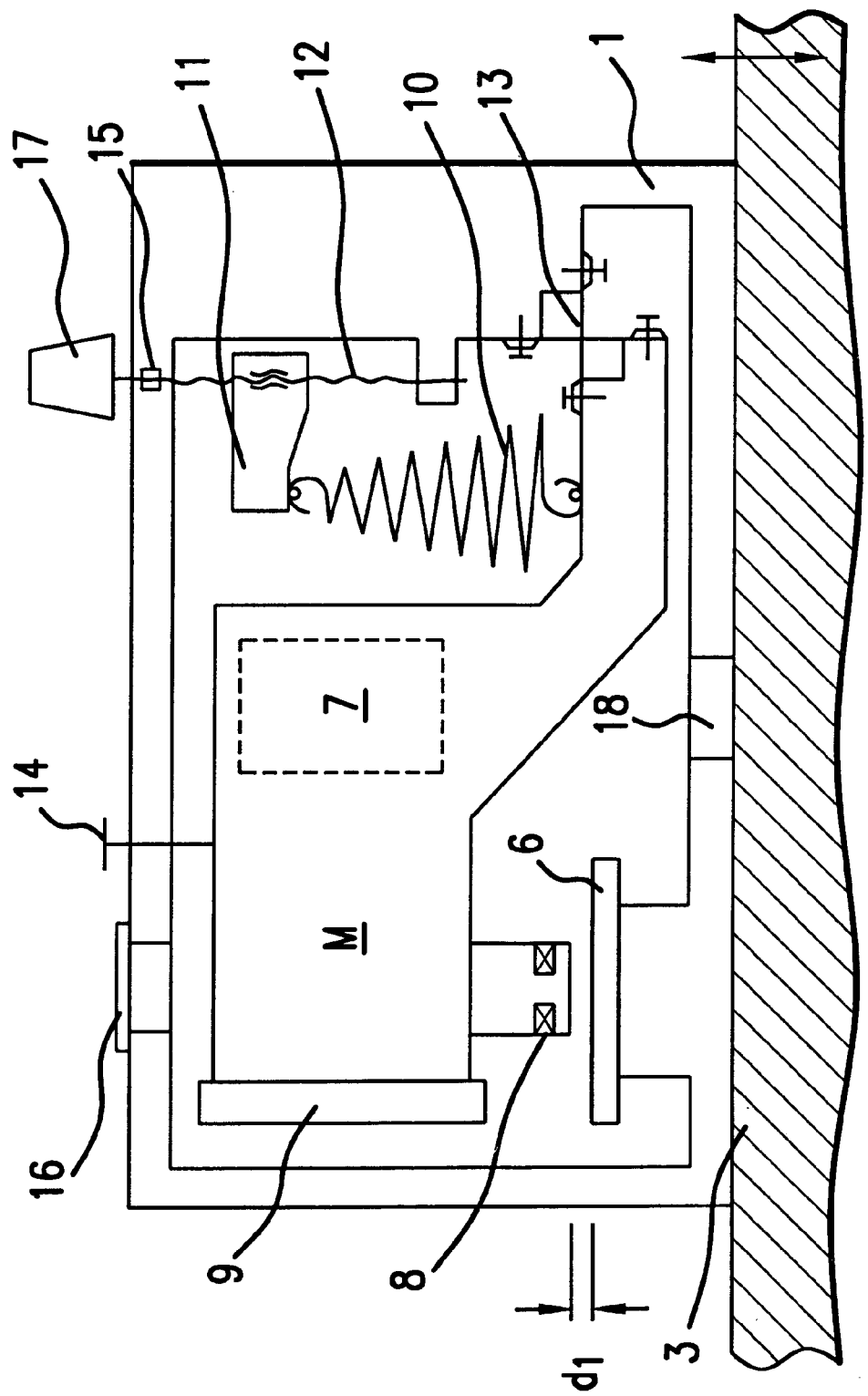
FIG. 10 illustrates the installation structure of the pulled and hung suspended arm single vibrator moving coil general type eddy-current amplitude sensor.

FIG. 10 illustrates the pulled and hung suspended arm single vibrator moving coil general type structure, in which a detecting coil 8 and a preamplifier 7 coupled therewith are formed into a single body, which is combined with a body of certain weight and an additional weight to form into an inertial mass piece M, which is suspended in housing 1 with the aid of one of a cylindrical extension spring 10 or cone or date-core shaped extension spring 10 with damping. This extension spring is used for restraining the resonance; two cross shaped springs 13, each of which is formed by a pair of rectangular spring plates arranged in cross, are fixed between housing 1 and one end of the inertial mass piece M to form a fulcrum, thereby the inertial mass piece becomes a suspended arm, and according to the requirement of a certain vibration measurement, plural pairs of cross shaped springs 13 may be used; said detecting coil 8 is installed at the suspended end of the inertial mass piece M; the adjustable additional weight 9 is installed at the far end of said suspended arm, thereby natural frequency of the vibrator can be changed for adapting to different requirements of the vibration measurement. An extension spring locking set-up 15 is used for locking a screw stem 12 which regulates the extension spring so as to keep the initial value of the target distance unchanged. A sliding piece 11 is used for connecting the prestressed cone-shaped spring 10 and the screw stem 12, and the tension force of the extention spring is regulated by a regulating knob 17; a mass piece locking set-up 14 is used for locking inertial mass piece M in the case that the sensor is not in operation, thereby facilitate its transportion. A static calibration spigot 16 is used for inserting and fixing a micrometer therein so as to carry out a static calibration for target distance d; or alternatively, a measuring stem is inserted and the absolute amplitude sensor is changed into a relative amplitude sensor. A connection screwed hole 18 is disposed at the bottom of the sensor for facilitating the fixing of the sensor on the vibrating body 3 measured. Eddy-current target 6 is fixed to housing 1.

In the above structure, it is also practicable to interchange the position of the coil and that of the eddy-current target, i.e., the eddy-current target together with a body of certain weight and an additional weight is formed into an inertial mass piece, and the coil and its preamplifier are fixed to the housing, thus the pulled and hung suspended arm single vibrator moving target general type structure is formed.(Fig. omitted)

Figure 11:
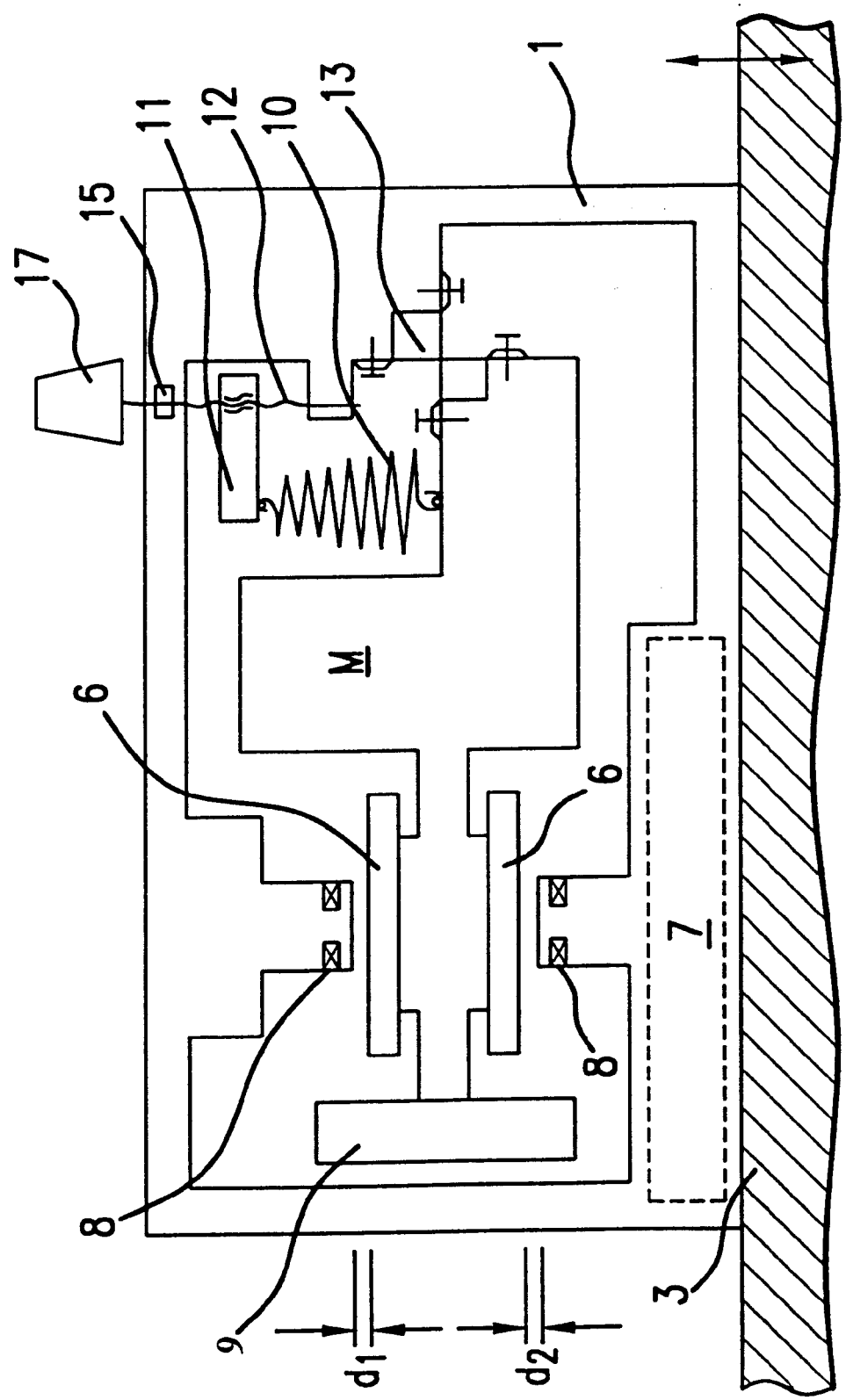
FIG. 11 illustrates the installation structure of the pulled and hung suspended arm single vibrator moving target differential type eddy-current amplitude sensor.

FIG. 11 illustrates the pulled and hung suspended arm single vibrator moving target differential type structure, in which two eddy-current targets 6 combined with a body of certain weight and an adjustable additional weight 9 are formed into an inertial mass piece M, which is suspended in housing 1 with the aid of a cylindrical extension spring 10 or cone or date-core shaped extension spring 10 with damping. A cross shaped spring 13 is formed by a pair of rectangular spring plates and is fixed between housing 1 and inertial mass piece M as a cross. Extension spring locking set-up 15 is mounted between inertial mass piece M and housing 1. Two detecting coils 8 coupled with their respective preamplifiers 7 are fixed to housing 1, and the amplitude of vibrating body 3 measured is proportional to the sum of the absolute variation values of two target distances $d_1$, $d_2$.

In the above structure, it is also practicable to interchange the positions of the eddy-current targets and those of the coils, i.e. the coils in combination with their respective preamplifiers, and a body of certain weight and an additional weight are formed into an inertial mass piece, and the eddy-current targets are fixed to the housing, thus the pulled and hung suspended arm single vibrator moving coil differential type structure is formed. (Fig. omitted)

Figure 12:
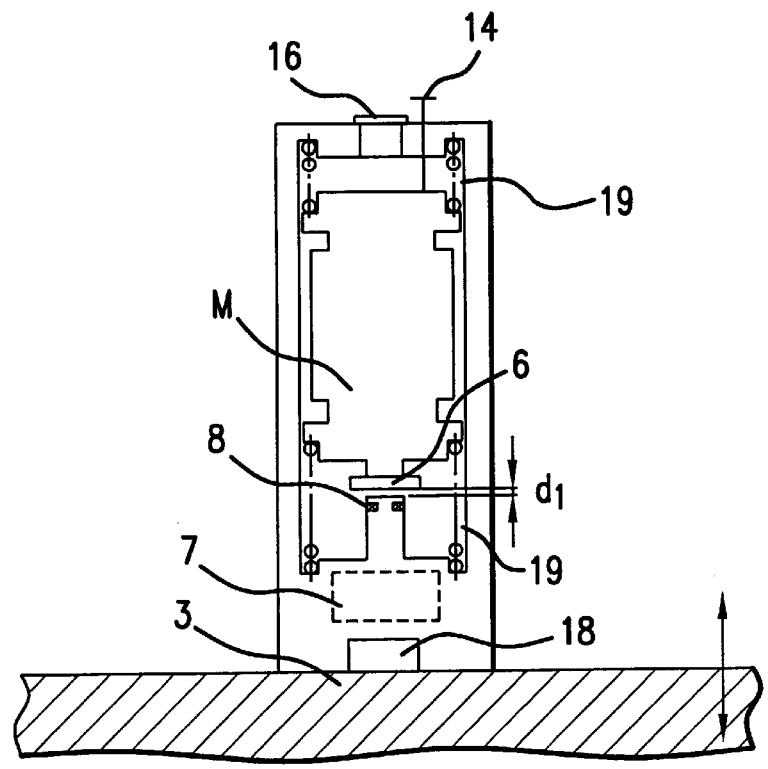
FIG. 12 illustrates the installation structure of a pair of cylindrical compression springs single vibrator moving target general type eddy-current amplitude sensor.

FIG. 12 illustrates a pair of cylindrical compression springs single vibrator moving target general type structure, in which an eddy-current target 6 in combination with a body of certain weight and an additional weight is formed into an inertial mass piece M, which is disposed between two cylindrical compression springs 19, and suspended in housing 1 with the aid of said two cylindrical compression springs 19. Detecting coil 8, corresponding to the eddy-current target 6, and its preamplifier 7 coupled therewith are fixed to housing 1. The amplitude of vibrating body 3 is proportional to the variation of target distance d.

Figure 13:
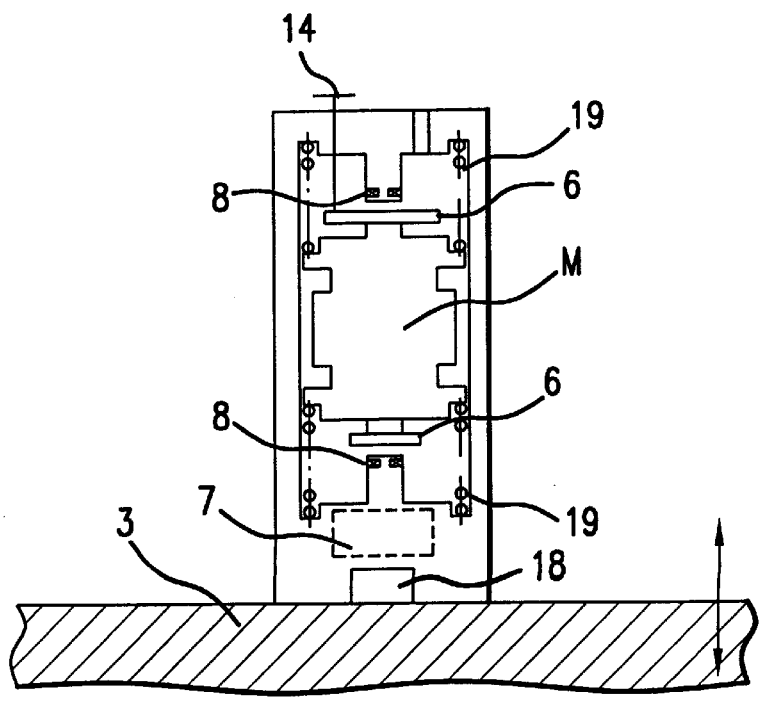
FIG. 13 illustrates the installation structure of a pair of cylindrical compression springs single vibrator moving target differential type eddy-current amplitude sensor.

FIG. 13 illustrates a pair of cylindrical compression springs single vibrator moving target differential type structure, in which two eddy-current targets 6 together with a body of certain weight and an additional weight are formed into an inertial mass piece M, which is disposed between two cylindrical compression springs 19, and suspended in housing 1 with the aid of said two cylindrical compression springs 19. Two detecting coils 8 as well as their preamplifiers 7 are fixed to housing 1.

In the structure mentioned above in FIG. 12, it is also practicable to interchange the position of the target 6 and that of the coil 8, i.e., the coil 8 and its preamplifier 7 are combined and formed into a single body, and together with a body of certain weight and an additional weight is formed into an inertial mass piece M, and the eddy-current target 6 is fixed to housing 1, thereby forming a pair of cylindrical compression springs single vibrator moving coil general type structure; in the structure mentioned above in FIG. 13, it is also practicable to interchange respectively the positions of the targets 6 and those of the two coils 8, i.e., the coils 8 and their preamplifiers 7 are combined respectively and formed into a single body, and together with a body of certain weight and an additional weight are formed into an inertial mass piece M, and the eddy-current targets 6 are fixed to housing 1, thereby forming a pair of cylindrical compression springs single vibrator moving coil differential type structure. (Fig. omitted)

Figure 14:
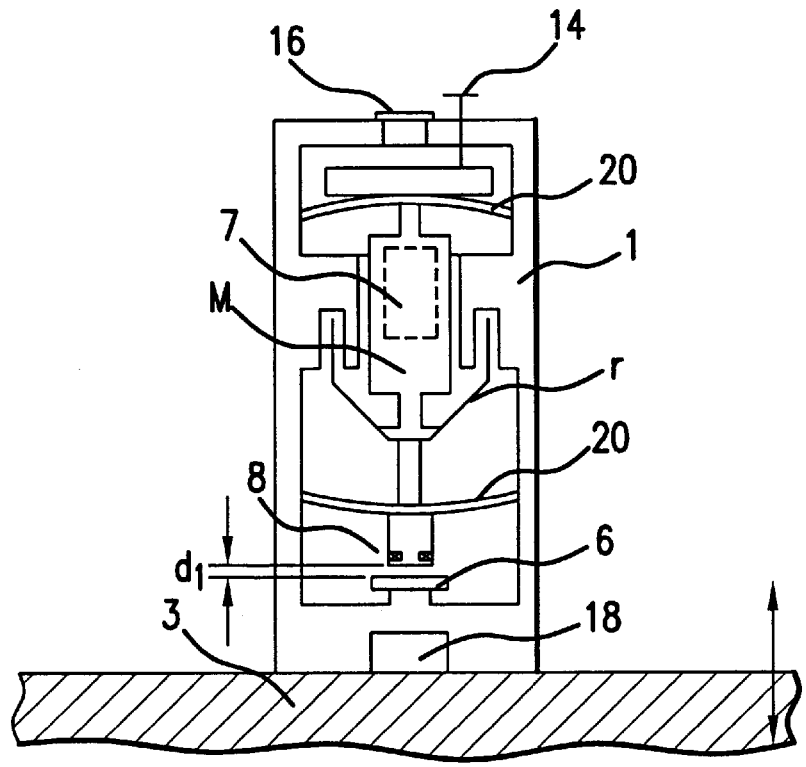
FIG. 14 illustrates the installation structure of a pair of spring plates single vibrator moving coil general type eddy-current amplitude sensor.

FIG. 14 illustrates a pair of spring plates single vibrator moving coil general type structure, in which detecting coil 8 and its preamplifier 7 are combined and formed into a single body, and together with a body of certain weight and an additional weight are formed into an inertial mass piece M, which is disposed between two circular spring plates 20, and suspended in housing 1 with the aid of said two spring plates 20. A damper r may be added when it is required. A eddy-current target 6 is fixed to housing 1, and the amplitude of vibrating body 3 is proportional to the variation of target distance d.

Figure 15:
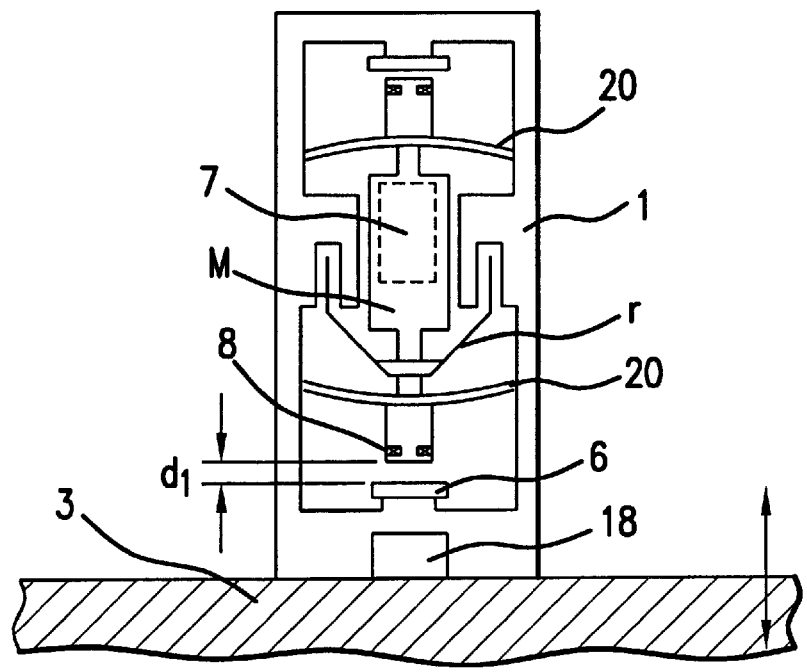
FIG. 15 illustrates the installation structure of a pair of spring plates single vibrator moving coil differential type eddy-current amplitude sensor.

FIG. 15 illustrates a pair of spring plates single vibrator moving coil differential type structure, in which two detecting coils 8 and their respective preamplifiers 7 are combined and formed into a single body, and together with a body of certain weight and an additional weight are formed into an inertial mass piece M, which is disposed between two circular spring plates 20, and suspended in housing 1 with the aid of said two spring plates. Two eddy-current targets are fixed to housing 1.

In the structure mentioned above in FIG. 14, it is also practicable to interchange the position of detecting coil 8 and that of eddy-current target 6, i.e. eddy-current target 6, together with a body of certain weight and an additional weight, is formed into an inertial mass piece M. The detecting coil 8 and its preamplifier 7 coupled therewith are fixed to housing 1, thereby forming a pair of spring plates single vibrator moving target general type structure; in the structure mentioned above in FIG. 15, it is also practicable to interchange respectively the positions of detecting coils 8 and those of eddy-current targets 6, i.e. eddy-current targets 6, together with a body of certain weight and an additional weight, are formed into an inertial mass piece M.

The detecting coils 8 and their preamplifiers 7 coupled therewith respectively are fixed to housing 1, thereby forming a pair of spring plates single vibrator moving target differential type structure. (Fig. omitted)

Another embodiment of the the present invention is to replace each detecting coil and eddy-current target of all the above-mentioned inertial eddy-current amplitude sensors with two plates of a capacitor, and replace each preamplifier of the eddy-current type with a measuring circuit of capacitor type sensor. Since the structural configuration of this capacitor type sensor is similar to the eddy-current amplitude sensor, the figures thereof are not provided in this specification. To change the capacitance, the distance between the plates or the effective plate area of the capacitor can be changed. The measuring circuit includes amplitude modulation, frequency modulation and pulse width modulation circuit.

INDUSTRIAL APPLICABILITY

The technical scheme of the sensor of the present invention strengthens the anti-disturbance property of monitoring the amplitude of the vibrating body measured, and is of high sensitivity. Its frequency range is broadened and it does not need static reference point. Moreover it is of small volume and convenient installation, and can be widely applied to the vibration monitoring technique for geological prospecting, earthquake, architecture, highway, bridge, transportation and huge equipment.

What is claimed is:

1. An absolute amplitude sensor device comprising an eddy-current displacement sensor and a vibrator, wherein said vibrator comprises an inertial mass piece, springs, a damper and a housing; said eddy-current sensor comprises an eddy-current target, a detecting coil and a preamplifier coupled with said detecting coil; said preamplifier and said detecting coil coupled therewith are mounted on said inertial mass piece and form a single body with said inertial mass piece; and the physical quantity extracted by said sensor is the absolute amplitude value of the vibrating body measured with respect to a inertial frame.

2. An absolute amplitude sensor device comprising an eddy-current displacement sensor and a vibrator, wherein said vibrator comprises an inertial mass piece, springs, a damper and a housing; said eddy-current sensor comprises an eddy-current target, a detecting coil and a preamplifier coupled with said detecting coil; said preamplifier and said detecting coil coupled therewith are mounted on the housing and form a single body with said housing; and the physical quantity extracted by said sensor is the absolute amplitude value of the vibrating body measured with respect to a inertial frame.

3. An absolute amplitude sensor device as claimed in claim 1, wherein said eddy-current displacement sensor comprises N detecting coils and the preamplifiers thereof, and N eddy-current targets, N is 1–20 integer; there are N inertial mass pieces, on each of which an adjustable additional weight piece is installed, N is 1–20 integer; an inertial mass piece locking set-up is mounted between said mass piece and said housing; a micrometer spigot used for static calibration is disposed on the housing; threaded fittings and a sticking plane are disposed on the housing for fixing said device to the vibrating body measured; and the output signal of said sensor is proportional to the amplitude of the vibrating body measured.

4. An absolute amplitude sensor device as claimed in claim 3, wherein the structure of said vibrator is of a pulled and hung suspended arm moving coil general type, each of the N detecting coils and the respective preamplifier coupled therewith are formed into a single body, which is formed into an inertial mass piece with a respective body of certain weight and an additional weight, thereby N inertial mass pieces are formed totally; one end of each of said inertial mass pieces is fixed to the housing by a cross-shaped spring made of a pair of rectangular spring plates to form a fulcrum, thereby the inertial mass piece becomes a suspended arm; said additional weight is disposed at the far end of the suspended arm; the part of said suspended arm between the gravitational line of said inertial mass piece and said fulcrum is suspended at one end of one of cylindrical, cone and date-core shaped prestressed extension springs, the other end of which is suspended at said housing; said detecting coil is mounted on the suspended end of said inertial mass piece; an extension spring locking set-up is mounted between the extension spring and the housing; and said N eddy-current targets are fixed to the housing.

5. An absolute amplitude sensor device as claimed in claim 3, wherein the structure of said vibrator is of a pulled and hung suspended arm moving coil differential type, every two of 2 N differential detecting coils and the preamplifiers respectively coupled therewith are formed into a group, each group together with a respective body of certain weight and an additional weight is formed into an inertial mass piece, and one end of each of the inertial mass pieces is fixed to the housing by a cross-shaped spring made of a pair of rectangular spring plates to form a fulcrum, thereby the inertial mass piece becomes a suspended arm; said additional weight is disposed at the far end of said suspended arm; the part of said suspended arm between the gravitational line of said inertial mass piece and said fulcrum is suspended at one end of one of cylindrical, cone and date-core shaped prestressed extension springs, the other end of which is suspended at the housing; said detecting coil is mounted on the suspended end of said inertial mass piece; an extension spring locking set-up is mounted between the extension spring and the housing; and every two of the 2 N eddy-current targets, as a group, are fixed to the housing.

6. An absolute amplitude sensor device as claimed in claim 3, wherein the structure of said vibrator is of a pulled and hung suspended arm moving target general type, each of N eddy-current targets in combination with a respective body of certain weight and an additional weight is formed into an inertial mass piece, one end of which is fixed to the housing by a cross-shaped spring made of a pair of rectangular spring plates to form a fulcrum, thereby the inertial mass piece becomes a suspended arm; said additional weight is disposed at the far end of the suspended arm; the part of the suspended arm between the gravitational line of said inertial mass piece and said fulcrum is suspended at one end of one of cylindrical, cone and date-core shaped prestressed extension springs, the other end of which is suspended at the housing; said eddy-current target is installed on the suspended end of said inertial mass piece; an extension spring locking set-up is mounted between the extension spring and the housing; and each of the N detecting coils and the respective preamplifier coupled therewith are formed into a single body and fixed to the housing.

7. An absolute amplitude sensor device as claimed in claim 3, wherein the structure of said vibrator is of a pulled and hung suspended arm moving targets differential type, every two of 2 N eddy-current targets are formed into a group, each group in combination with a respective body of certain weight and an additional weight is formed into an inertial mass piece, one end of which is fixed to the housing by a cross-shaped spring made of a pair of rectangular spring plates to form a fulcrum, thereby the inertial mass piece becomes a suspended arm; said additional weight is disposed at the far end of the suspended arm; the part of the suspended arm between the gravitational line of said inertial mass piece and said fulcrum is suspended at one end of one of cylindrical, cone and date-core shaped prestressed extension springs, the other end of which is suspended at the housing; said eddy-current targets are installed on the suspended end of said inertial mass piece; an extension spring locking set-up is mounted between the extension spring and the housing; and every two of the 2 N detecting coils and the preamplifiers respectively coupled therewith are formed into a single body and fixed to the housing.

8. An absolute amplitude sensor device as claimed in claim 3, wherein the structure of said vibrator is of a pair of cylindrical compression springs moving coil general type, each of the N detecting coils and the preamplifier respectively coupled therewith are formed into a single body, which together with a respective body of certain weight and an additional weight is formed into an inertial mass piece, totally N inertial mass pieces, each of which is installed respectively between two cylindrical compression springs, and suspended in the housing with the aid of said two cylindrical compression springs; and N eddy-current targets are fixed to the housing.

9. An absolute amplitude sensor device as claimed in claim 3, wherein the structure of said vibrator is of a pair of cylindrical compression springs moving coil differential type, every two of the 2 N differential detecting coils and the preamplifiers respectively coupled therewith are formed into a group, each group together with a respective body of certain weight and additional weight is formed into an inertial mass piece, which is installed between two cylindrical compression springs, and suspended in the housing with the aid of said two cylindrical compression springs; and every two of the 2 N eddy-current targets as a group are fixed to the housing.

10. An absolute amplitude sensor device as claimed in claim 3, wherein the structure of said vibrator is of a pair of cylindrical compression springs moving target general type, N eddy-current targets in combination with respective bodies of certain weight and additional weights thereof are formed into N inertial mass pieces, each of which is disposed respectively between two cylindrical compression springs and is suspended in the housing with the aid of said two cylindrical compression springs; and each of the N detecting coils and the preamplifier coupled therewith are formed into a group and fixed to the housing.

11. An absolute amplitude sensor device as claimed in claim 3, wherein the structure of said vibrator is of a pair of cylindrical compression springs moving target differential type, every two of the 2 N eddy-current targets are formed into a group, each group in combination with a respective body of certain weight and an additional weight is formed into an inertial mass piece, totally N inertial mass pieces, each of which is disposed respectively between two cylindrical compression springs, and suspended in the housing with the aid of said two cylindrical compression springs; and every two of the 2 N detecting coils and the preamplifiers coupled respectively therewith are formed into a group and fixed to the housing.

12. An absolute amplitude sensor device as claimed in claim 3, wherein the structure of said vibrator is of a pair of spring plates moving coil general type, each of the N detecting coils and the preamplifier coupled therewith are formed into a single body, totally N single bodies, which in combination with respective bodies of certain weight and additional weights are formed into N inertial mass pieces, each of which is disposed respectively between two circular spring plates, and suspended in the housing with the aid of said two circular spring plates; and N eddy-current targets are fixed to the housing.

13. An absolute amplitude sensor device as claimed in claim 3, wherein the structure of said vibrator is of a pair of spring plates moving coil differential type, every two of the 2 N differential detecting coils and the preamplifiers coupled therewith are formed into a single body, and in combination with a body of certain weight and an additional weight is formed into an inertial mass piece, which is disposed respectively between two circular spring plates, and suspended in the housing with the aid of said two circular spring plates; and every two of the 2 N eddy-current targets are formed into a group and fixed to the housing.

14. An absolute amplitude sensor device as claimed in claim 3, wherein the structure of said vibrator is of a pair of spring plates moving target general type, N eddy-current targets in combination with respective bodies of certain weight and additional weights are formed into N inertial mass pieces, each of which is disposed respectively between two circular spring plates, and suspended in the housing with the aid of said two circular spring plates; each of the N detecting coils and the preamplifier coupled therewith are formed into a single body and fixed to the housing.

15. An absolute amplitude sensor device as claimed in claim 3, wherein the structure of said vibrator is of a pair of spring plates moving target differential type, every two of the 2 N differential eddy-current targets are formed into a group, each group combined with a respective body of certain weight and an additional weight is formed into an inertial mass piece, which is disposed respectively between two circular spring plates, and suspended in the housing with the aid of said two spring plates; every two of the detecting coils and the respective preamplifiers coupled therewith are formed into a group and fixed to the housing.

16. An absolute amplitude sensor device as claimed in claim 2, wherein said eddy-current displacement sensor comprises N detecting coils and the preamplifiers thereof, and N eddy-current targets, N is 1–20 integer; there are N inertial mass pieces, on each of which an adjustable additional weight piece is installed, N is 1–20 integer; an inertial mass piece locking set-up is mounted between said mass piece and said housing; a micrometer spigot used for static calibration is disposed on the housing; threaded fittings and a sticking plane are disposed on the housing for fixing said device to the vibrating body measured; and the output signal of said sensor is proportional to the amplitude of the vibrating body measured.

17. An absolute amplitude sensor device as claimed in claim 16, wherein the structure of said vibrator is of a pulled and hung suspended arm moving coil general type, each of the N detecting coils and the respective preamplifier coupled therewith are formed into a single body, which is formed into an inertial mass piece with a respective body of certain weight and an additional weight, thereby N inertial mass pieces are formed totally; one end of each of said inertial mass pieces is fixed to the housing by a cross-shaped spring made of a pair of rectangular spring plates to form a fulcrum, thereby the inertial mass piece becomes a suspended arm; said additional weight is disposed at the far end of the suspended arm; the part of said suspended arm between the gravitational line of said inertial mass piece and said fulcrum is suspended at one end of one of cylindrical, cone and date-core shaped prestressed extension springs, the other end of which is suspended at said housing; said detecting coil is mounted on the suspended end of said inertial mass piece; an extension spring locking set-up is mounted between the extension spring and the housing; and said N eddy-current targets are fixed to the housing.

18. An absolute amplitude sensor device as claimed in claim 16, wherein the structure of said vibrator is of a pulled and hung suspended arm moving coil differential type, every two of 2 N differential detecting coils and the preamplifiers respectively coupled therewith are formed into a group, each group together with a respective body of certain weight and an additional weight is formed into an inertial mass piece, and one end of each of the inertial mass pieces is fixed to the housing by a cross-shaped spring made of a pair of rectangular spring plates to form a fulcrum, thereby the inertial mass piece becomes a suspended arm; the part of said suspended arm between the gravitational line of said inertial mass piece and said fulcrum is suspended at one end of one of cylindrical, cone and date-core shaped prestressed extension springs, the other end of which is suspended at the housing; said detecting coil is mounted on the suspended end of said inertial mass piece; an extension spring locking set-up is mounted between the extension spring and the housing; and every two of the 2 N eddy-current targets, as a group, are fixed to the housing.

19. An absolute sensor device as claimed in claim 16, wherein the structure of said vibrator is of a pulled and hung suspended arm moving target general type, each of N eddy-current targets in combination with a respective body of certain weight and an additional weight is formed into an inertial mass piece, one end of which is fixed to the housing by a cross-shaped spring made of a pair of rectangular spring plates to form a fulcrum, thereby the inertial mass piece becomes a suspended arm; said additional weight is disposed at the far end of the suspended arm; the part of the suspended arm between the gravitational line of said inertial mass piece and said fulcrum is suspended at one end of one of cylindrical, cone and date-core shaped prestressed extension springs, the other end of which is suspended at the housing; said eddy-current target is installed on the suspended end of said inertial mass piece; an extension spring locking set-up is mounted between the extension spring and the housing; and each of the N detecting coils and the respective preamplifier coupled therewith are formed into a single body and fixed to the housing.

20. An absolute amplitude sensor device as claimed in claim 16, wherein the structure of said vibrator is of a pulled and hung suspended arm moving targets differential type, every two of 2 N eddy-current targets are formed into a group, each group in combination with a respective body of certain weight and an additional weight is formed into an inertial mass piece, one end of which is fixed to the housing by a cross-shaped spring made of a pair of rectangular spring plates to form a fulcrum, thereby the inertial mass piece becomes a suspended arm; said additional weight is disposed at the far end of the suspended arm; the part of the suspended arm between the gravitational line of said inertial mass piece and said fulcrum is suspended at one end of one of cylindrical, cone and date-core shaped prestressed extension springs, the other end of which is suspended at the housing; said eddy-current targets are installed on the suspended end of said inertial mass piece; an extension spring locking set-up is mounted between the extension spring and the housing; and every two of the 2 N detecting coils and the preamplifiers respectively coupled therewith are formed into a single body and fixed to the housing.

* * * * *